United States Patent [19]
Zeller

[11] Patent Number: 5,487,771
[45] Date of Patent: Jan. 30, 1996

[54] HIGH-EFFICIENCY METAL MEMBRANE ELEMENT, FILTER, AND PROCESS FOR MAKING

[75] Inventor: Robert S. Zeller, Boston, Mass.

[73] Assignee: Millipore Corporation, Bedford, Mass.

[21] Appl. No.: 281,047

[22] Filed: Jul. 27, 1994

Related U.S. Application Data

[63] Continuation of Ser. No. 71,554, Jun. 4, 1993, abandoned.

[51] Int. Cl.[6] .............................. B01D 46/10; C22C 1/04
[52] U.S. Cl. .............................. 55/523; 55/502; 55/503; 55/DIG. 5; 419/2; 419/24; 419/39
[58] Field of Search ....................... 95/56; 96/4; 55/523, 55/490, 495, 502, 503, 505, 510, DIG. 5; 419/2, 24, 29, 38, 39, 42, 68

[56] References Cited

U.S. PATENT DOCUMENTS

| | | | |
|---|---|---|---|
| 2,300,048 | 10/1942 | Koehring | 419/2 |
| 2,309,018 | 1/1943 | Shaw | 419/2 |
| 3,759,709 | 9/1973 | Asbury | 75/211 |
| 3,933,652 | 1/1976 | Weichselbaum et al. | 419/2 X |
| 4,430,294 | 2/1984 | Tracey | 419/2 |
| 4,560,478 | 12/1985 | Narumiya | 55/523 X |
| 4,568,595 | 2/1986 | Morris | 55/523 X |
| 4,637,877 | 1/1987 | Hartmann et al. | 55/523 X |
| 4,707,184 | 11/1987 | Hasiguchi et al. | 419/2 X |
| 4,758,272 | 7/1988 | Pierotti et al. | 55/523 X |
| 4,894,158 | 1/1990 | Morita et al. | 55/523 X |
| 4,912,076 | 3/1990 | Mizrah et al. | 55/523 X |
| 4,976,760 | 12/1990 | Helferich et al. | 55/523 X |
| 5,069,697 | 12/1991 | Hamaguchi et al. | 55/523 |
| 5,072,592 | 12/1991 | Ishigaki | 62/55.5 |
| 5,114,447 | 5/1992 | Davis | 55/485 |
| 5,177,035 | 1/1993 | Gee et al. | 55/523 X |
| 5,204,067 | 4/1993 | Haerle | 55/523 X |

FOREIGN PATENT DOCUMENTS

| | | | |
|---|---|---|---|
| 61-118227 | 6/1986 | Japan | 55/523 |
| 62-287027 | 12/1987 | Japan . | |
| 1-304022 | 12/1989 | Japan | 55/523 |
| 3-056631 | 3/1991 | Japan . | |

OTHER PUBLICATIONS

Ownby, P. D. et al., "Final Sintering of $Cr_2 O_3$", J. Am. Ceramic Soc. 55(9): 433–436 (1972).

Hagel, W. C. et al., "Initial Sintering of $\alpha$–$Cr_2 O_3$", J. Am. Ceramic Soc. 49(1): 23–26 (1966).

Neve, J. M. et al., "Initial Sintering of $Cr_2 O_3$", J. Am. Ceramic Soc.—Discussions and Notes 57(6): 274–275 (1974).

Katayama, H. G., "The Hydrogen Reduction Kinetics of Chromic Oxide Pellet", J. Japan Inst. Metals 50(11): 993–998 (1986).

Rubow, K. L. et al., "Particle Penetration Characteristics of Porous Metal Filter Media For High Purity Gas Filtration", Institute of Environmental Sciences; 1991, pp. 834–840.

Callister, W. D. et al., "Sintering Chromium Oxide with the Aid of $TiO_2$", J. Am. Ceramics Soc. 62(3–4): 208–211 (1979).

Huppmann, W. J.; "Cold Isostatic Pressing of Stainless Steel Filter Cartridges", pp. 579–588.

Tracey, V. A.; "Effect of Sintering Conditions on Structure and Strength of Porous Nickel", Powder Mettalurgy 2:45–48 (1979).

Tracey, V. A.; "Usage, Manufacture and Properties of Porous Sintered Nickel", Powder Mettalurgy Int'l. 16(4): 167–170 (1984).

*Primary Examiner*—Robert Spitzer
*Attorney, Agent, or Firm*—Andrew T. Karnakis

[57] ABSTRACT

A high-porosity metallic membrane element comprising a sintered element having at least about 55% porosity, the sintered element comprising a matrix of substantially interconnected pores, each of the pores being defined by a plurality of dendtritic metallic particles. A preferred form is made from pure nickel, preferably filamentous nickel powder. The high-porosity metallic membrane element, comprising the aforementioned sintered element having at least about 55% porosity, can be sealed within a filter housing to produce a highly porous filter device with a filtered fluid flow path through the metal membrane element. Also disclosed is a method of making the high-porosity metallic membrane element which includes depositing by air-laying techniques a substantially uniform low-density bed of a sinterable dendritic material into a mold suitable for applying compressive force thereto, compressing the low-density bed of sinterable dendritic material to form a green form, and sintering the green form. The present filter devices exhibit superior porosity and face velocities, negligible outgassing and limited particle shedding when compared to the devices of the prior art.

19 Claims, 6 Drawing Sheets

HIGH-EFFICIENCY METAL MEMBRANE ELEMENT, FILTER, AND PROCESS FOR MAKING

This is a continuation of application Ser. No. 08/071,554 filed on Jun. 4, 1993, now abandoned.

BACKGROUND OF THE INVENTION

1. Field of the Invention

The present invention generally relates to a fluid filter and a process for making it. In particular, the invention is a novel all-metal gas filter with high efficiency and low outgassing characteristics that is useful as a point-of-use filter for semiconductor process gases.

2. Description of the Prior Art

Semiconductor manufacturing is constrained by the limitations of purity. In chemical vapor deposition of the alternating layers of silicon and dopant, a critical aspect of the process involves the absence of any particulate impurities. The presence of a minute particle can destroy an entire silicon wafer representing many dollars of potential end-product. To that end, an entire industry has developed concerned with only one thing—the filtering of the gases that may come into contact with semiconductor product during its formation.

Clean rooms equipped with HEPA (High Efficiency Particulate Air) filters are the first line of defense. Process equipment is located within "clean rooms" that are filled with carefully filtered air. The design of the equipment itself endeavors to minimize particle shedding, outgassing, and contamination from the materials used to transport and deliver high-purity gases such as silane, arsine, hydrochloric acid and phosphine. An important component in these delivery systems is the filter which insures that particulate contamination does not reach the point where the gas is discharged onto the work (point of use). These filters must not only remove any particulate material, but also must not add any gaseous contamination to the high purity gases. In addition, the gas delivery systems must also be as compact as possible to eliminate contamination, both particulate and gaseous, which might arise from either the installation of such systems, or the normal wear associated with usage. This is especially the case with highly corrosive gases such as hydrochloric acid. Therefore the filters must not only remove particulate material and not be a contributor of gaseous impurities, but they must also be as compact as possible and have small internal and filter volumes.

Various filters are used for filtration of such gaseous fluids to insure ultra high levels of purity in terms of particulate contamination. These include: organic membrane filters, ceramic filters, filters formed from porous metal structures and filters formed from metal fibers. Although some of these various filter media are capable of providing particulate contamination control to levels less than one part per million or greater in terms of particulate control, they are characterized by large filter areas. Due to the large flow area required to sustain flow at reasonable pressures and maintain low face velocities to insure particulate retention, gaseous impurities such as moisture, oxygen and especially hydrocarbons are often present in detectable levels (parts per million). This contamination can occur during manufacture of the filter, during installation of the filter when it is exposed to an atmosphere other than a high purity gas, or even as a result of outgassing from the material the filter is packaged in. In addition, large filter volumes require relatively larger housings to contain them. This in turn results in a greater likelihood of contamination due both to installation and usage and the need for larger gas delivery systems to fit the filters.

Present metal filters include stainless steel, nickel, or nickel alloy sintered-powder types such as the Wafergard® II SF ( Millipore Corporation, Bedford, Mass.), and the Mott GasShield (Mott Metallurgical Corporation, Farmington, Conn.) (See U.S. Pat. No. 5,114,447, Davis) line of filters. Such filters, being all metal, exhibit low outgassing, high efficiency, corrosion and temperature resistance, low porosity and gas throughput, and high structural strength. However, low porosity has continued to be a drawback for typical sintered metal powder filter elements. Porosities for the above filters range from 40 to 44%, limiting the flow-through characteristics of these filters. The low porosities are inherent in the processes used to manufacture sintered metal powder filters. Typically, the powders are compacted into a mold to form a "green form," then sintered to join the metal particles together to impart the necessary strength. The final filter elements (or "membranes") may be cut from a flat sintered sheet of metallic powder, or molded into the final shape in the molding step. The temperatures at which the sintering proceeds are a critical factor in determining the final porosity. Higher temperatures lead to increased strength, but lower porosity; lower temperatures lead to decreased strength and higher porosity. Until now, the final porosity was limited to about 45% in the sintered metal powder art.

There exists a need for increased porosity and gas throughput in the metal filter art. Increased porosity would allow for the construction of smaller filters with all the positive aspects of highly porous metal filters, with less outgassing and particulate shedding problems.

SUMMARY OF THE INVENTION

In accordance with the present invention it has been found that highly porous, high-flow filter devices made front filamentary metal powders can be made which require a fraction of the filter volume found in existing filters. The filters of the present invention retain the high level of particulate efficiency (less that one part per million passage through the filter) found in existing filters, while operating at exponentially higher face velocities. In addition, the gas pressure required to sustain these velocities is equivalent to or less than existing filters. The filter of the present invention has minimal internal volume and is highly compact, resulting in very low contaminant generation due to exposure to atmospheres other than high purity gases and the wear associated with usage. In addition, the present invention shares other advantageous characteristics of porous metal filters, namely good mechanical and thermal properties allowing operation at elevated temperatures and high differential pressures, and the absence of particulate shedding associated with prolonged usage.

The present invention is a high-porosity metallic membrane element, comprising a sintered element having at least about 55% porosity, the sintered element comprising a matrix of substantially interconnected pores, each of the pores being defined by a plurality of dendritic metallic particles. A preferred form of the invention is made from dendritic nickel powder and has a porosity in excess of 65%. In a preferred embodiment a low sintering temperature of from about 675 degrees to about 725 degrees centigrade is employed. No binder is employed, practically eliminating outgassing in the final membrane element.

The invention also includes a high-porosity metallic membrane filter device. The filter includes a sintered membrane element having at least about 55% porosity, the sintered element comprising a matrix of substantially interconnected pores, each of the pores being defined by a plurality of dendritic metallic particles. The filter also includes a filter housing defining a fluid conduit, the conduit being a casing for retaining the filter element in the fluid flow path, the casing having a front and a back with the element being located between them. In a preferred embodiment, the filter element is welded to the casing wall. Means for sealably connecting the casing to a fluid to be filtered are provided by utilizing typical Swagelock®-style connectors.

Another aspect of the invention is a method of making a high-porosity metallic membrane element comprising the steps of first depositing a substantially uniform low-density bed of a sinterable dendritic material into a mold suitable for applying compressive force thereto. The second step is compressing the low-density bed of sinterable dendritic material to form a green form. The last step is sintering the green form at a temperature below the melting point of the metallic material. In a preferred method of the invention, depositing the substantially uniform low-density bed includes, but is not limited to, the steps of first air-laying the sinterable dendritic material into a mold suitable for applying compressive force thereto, the air-laid bed having a density less than or equal to the density of the sinterable dendritic material. In a preferred embodiment, the sinterable dendritic material is filamentary nickel powder. Compressing the bed of nickel is accomplished at a pressure below about 500 psi, in the absence of any binder. The sintered green form is compressed at a second higher pressure, thereby imparting additional structural rigidity to the element. The higher pressure is generally in the range of 600–1100 psi. The final porosity of the sintered membrane element is generally from about 55% to about 70%.

Accordingly, it is an object of the present invention to provide a highly efficient high-porosity metallic membrane element useful as a point-of-use filter in the semiconductor industry. The high efficiency of the invention allows a substantial savings in space utilized in the process instrumentation, reduced outgassing due to decreased internal surface area, and reduced pressure drop over the length of the filter.

It is another object of the invention to provide a method for forming high-porosity metallic membranes with excellent structural strength, very high porosity, and without the use of any binders.

It is still another object of the invention to provide a membrane element that may be formed in any of numerous shapes for inclusion into a filter housing.

BRIEF DESCRIPTION OF THE DRAWINGS

FIGS. 2 (a–f) are schematic representations of the process for producing a metallic membrane element.

DETAILED DESCRIPTION OF THE PREFERRED EMBODIMENTS

The invention provides a high efficiency high-porosity all metal filter membrane and a method for making it. Filters incorporating the membrane exhibit increased fluid throughput, decreased pressure loss, substantially lower outgassing, and decreased size and complexity. These characteristics make this filter ideal as a point-of-use process gas filter in the semiconductor, and related, industries.

The following terms are used in this application. The term "porosity" is defined as the amount of pore volume per total volume of the membrane element. Per cent porosity is the pore volume divided by the total membrane element volume, multiplied by 100.

As used herein, the term "metallic" is meant to describe all metal-containing materials. This includes, but is not limited to, pure metals, mettaloids, metal oxides, metal alloys, and similar combinations that would be obvious to one of ordinary skill in the metalworking art.

As used herein the term "membrane element" describes the wafer-like product of this invention. It is characterized in that it has a high internal pore volume, excellent structural rigidity and strength, and low pressure drop when fluids, specifically gases, are passed through it. Other shapes may be used in addition to wafers.

As used herein the term "matrix" describes a physical structure comprising a network of interrelated pores or crevice-like areas. The matrix, while generally a uniform structure, is not necessarily 100% uniform. Some pores may be completely unconnected to other pores, and thus may not be connected to the matrix. "Substantially interconnected" can thus be interpreted to mean that the majority of the pores will touch upon or share elements of at least one other pore, thereby allowing communication between the pores.

As used herein the term "dendritic" refers to the tree-like appendages that the metallic particles display. The term comes from "dendrite" which is a highly branched nerve cell. The dendritic property of the metallic powder makes it possible to attain a higher pore area than with non-dendritic metal powders because of the interactions of the branches with each other. Other metal powders which are or may be made dendritic come within the scope of this invention.

As used herein the term "green form" is a term well-known in the sintering art. It refers to the compressed metal powder structure before it is sintered. The green form displays a higher porosity than the final sintered membrane, but is very fragile.

As used herein the term "sinterable dendritic material" refers to any matter whose individual particles have a highly branched external surface, the particle also being capable of being sintered.

As used herein the term "substantially uniform" when used to describe the low-density bed means that there are few or no significant local variations in the density of the air-laid bed.

Figure 1A:
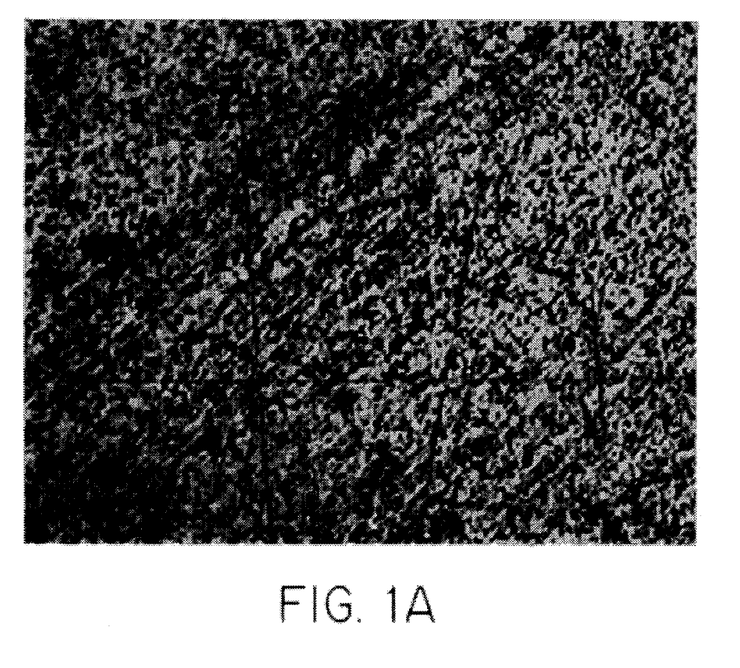
FIG. 1(a) is an photomicrograph of the surface of a sintered nickel membrane element made in accordance with the present invention. A 10 μm scale is provided for purposes of illuminating the relative sizes of the pores.

With reference now to FIG. 1(a), a close-up photomicrograph of a sintered metallic membrane element made in accordance with the method of the invention is shown. The membrane depicted is comprised of a filamentary nickel powder. In a preferred embodiment a filamentary nickel powder such as commercially available INCO 255 (Novamet Specialty Products, Wyckoff, N.J.) is used. Applicant has discovered that under the proper conditions of pressure, temperature and time, a novel and surprisingly porous material can be fabricated. While the present invention is primarily described as employing filamentary nickel powders with a Fisher size of between 2 and 3 μm (ASTM B 330), it is understood that other metal powders having the physical characteristics of this filamentary, dendritic powder may be employed to produce highly porous metal membranes, using the same techniques as described herein. Applicant has discovered that manipulation of certain critical conditions results in a surprisingly porous yet strong metallic membrane structure. In this regard, other filamentary metal powders may also be used or later developed which may be successfully used in this invention. The size of the pores shown in FIG. 1(a) ranges from about 2 to about 10 μm. The density of the starting filamentary powdered metal is typically 0.5 to 1.0 g/cc. The final product density is between about 2.75 and 3.0 g/cc.

Figure 1B:
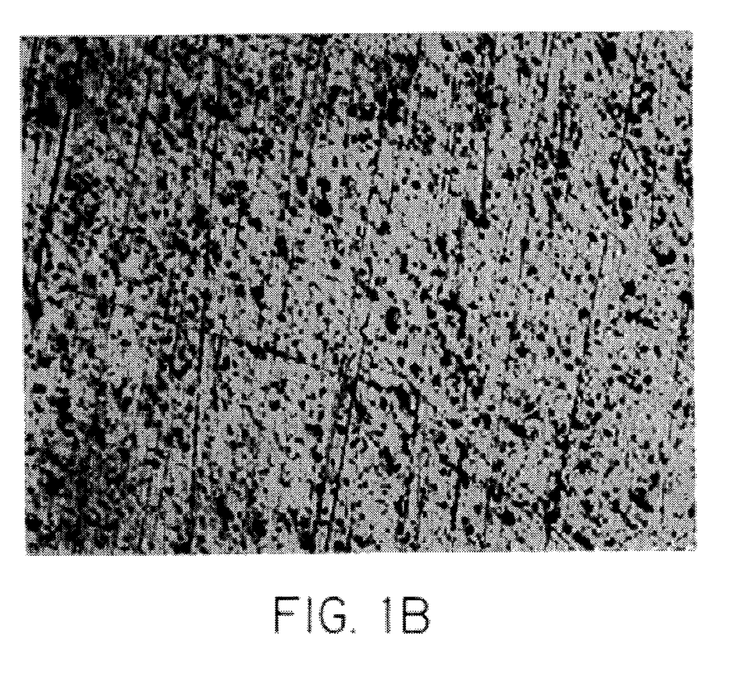
FIG. 1(b) is an photomicrograph of the surface of a prior art sintered nickel membrane element, taken under the same conditions as FIG. 1(a). Pore sizes appear similar, but the apparent pore density is visibly lower.

FIG. 1(b) is a similar photomicrograph of a prior art nickel filter taken under identical conditions. Note that the pore size is approximately the same as the present invention, but the pore frequency is visibly less. This is reflected in the fact that the density of the prior art filter is 5.0–5.75 g/cc, while the density of the membrane of the present invention is from about 2.75 to 3.0 g/cc.

FIG. 2 is a schematic generally describing the process of making a metallic membrane element. In accordance with the process of the present invention, a highly porous metal membrane is prepared by employing a variety of novel operations. Generally, the steps of the process include depositing a uniform bed of metal powder by air-laying a bed of sinterable dendritic metallic powder to form a highly uniform, exceedingly low-density powder bed whose apparent density is equal to or less than that of the powder as it is obtained from its container (FIG. 2(a)). The next step is the low-pressure press of such a bed to form a high-porosity semi-self supporting green form (FIG. 2(b)), and then the low temperature sintering of the green form to produce a self-supporting highly porous metal membrane with porosity exceeding 70% (FIG. 2(c)).

Figure 2A:
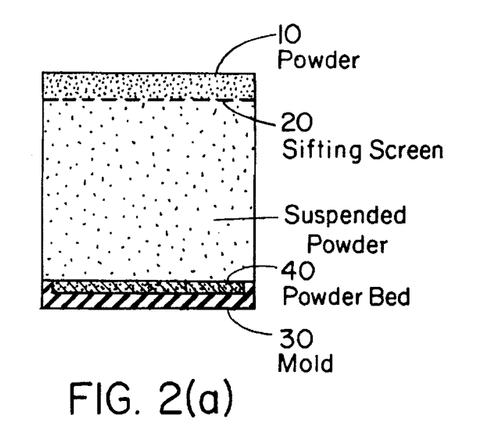
FIG. 2(a) depicts the air-laying step and apparatus used therein.

FIG. 2(a) depicts the first step of air-laying. As mentioned above, the formation of an exceedingly low-density bed of high uniformity is accomplished through the use of air-laying procedures. The term "air-laying" as used herein refers to the procedure whereby a pre-determined mass of powder 10 is sifted through a screen sieve 20 and allowed to fall under the influence of gravity into a mold 30 below of fixed volume. Since the powder is "fluffed up" in this manner, its density becomes lower than that of the packaged powder. The distance the powder falls before coming into contact with the mold will necessarily vary depending on the area and shape of the mold. A variety of individual molds can be used depending upon the final shape and size of the desired product. For example, a 13 cm diameter round mold requires a falling height of at least 25 cm when using filamentary nickel powders to insure a powder bed 40 of substantially uniform thickness and density. A larger diameter mold would require a larger falling distance. One of ordinary skill in the art will be able to determine this height through the use of routine experimentation, given the examples set forth herein. The bed 40, formed in the manner described, has a density equal to or less than that of the apparent density of the powder 10. Apparent density is determined following the procedure outlined in ASTM B 329. For filamentary nickel powders with an apparent density of approximately 1.0 g/cc the air-laid bed density can be as low as 0.7 g/cc.

Figure 2B:
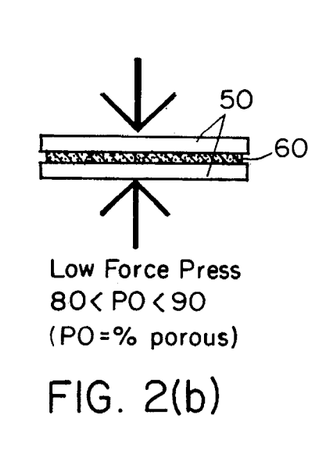
FIG. 2(b) shows the second step of low-pressure compression of the air-laid powder into a green form. Porosity (PO) of the green form is about 80–90%.

Now with reference to FIG. 2(b) the air-laid bed 40 formed as described is then pressed using compressing means 50 to the desired thickness using relatively low pressure, forming a green form 60. The resulting porosity ranges from 80–90%. The degree of pressure required necessarily depends on three variables, namely the density of the air-laid bed 40, the thickness of the bed, and the desired thickness of the pressed green form 60. For example, for a bed with a density of 0.8 g/cc and a thickness of 0.6 cm, a force of 30 kg/cm$^2$ (430 psi) is required to obtain a green form thickness of 0.4 cm. The density of such a green form would be 1.3 g/cc and have a porosity of 85%. The green form 60 is self-supporting only to the extent that it can, with care, be removed from the mold while retaining its structure. However, the introduction of relatively minor stress on green form 60 can cause it to lose its integrity.

Figure 2C:
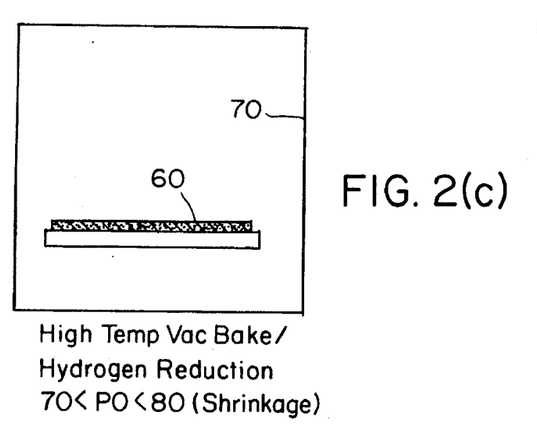
FIG. 2(c) depicts the high-temperature vacuum bake/hydrogen reduction, resulting in a sintered green form with a PO ranging from 70–80%.

Now with reference to FIG. 2(c), self-supporting green form 60 is given additional strength through the sintering step depicted therein. Generally, sintering is accomplished by heating a metallic powder in a sintering oven 70 to a temperature below its melting point in the presence of an inert or reducing atmosphere, or in vacuum. One of ordinary skill in the an of sintering will be able to determine the specific atmospheric conditions in which to sinter. The temperature and, to a lesser degree, the duration of the sintering process, are two critical factors which determine the final dimensions, and hence porosity, of the metal membrane. The porosity of the sintered product typically decreases to 70–80%. This occurs as a result of both sinter bonding of the powder particles and shrinkage of the membrane. A lower temperature and shorter sinter duration result in a membrane with smaller degrees of both sinter bonding and shrinkage. For example, a green form with a porosity of 80% sintered at 950° C. for 5 minutes results in a membrane with a porosity of 58%. The same green form sintered at 800° C. for 5 minutes results in a membrane with 72% porosity. It is apparent that a decrease in temperature results in an increase in resultant porosity. Applicant has discovered that sintering at even lower temperatures is possible. However, a lower limit to temperature does exist insofar as a given metal will not sinter unless given sufficient heat. The lower limit for sintering for filamentary nickel powder with a Fisher size of 2–3 μm has generally been found to be between about 500° and 600° C. The preferred form of the invention utilizes temperatures between about 675° and 725° C., as this results in the appropriate membrane porosity and dimensions when combined with the proper formation of the air-laid bed and green form. A most preferred form of the invention utilizes a sintering temperature of 675° C.

Figure 2D:
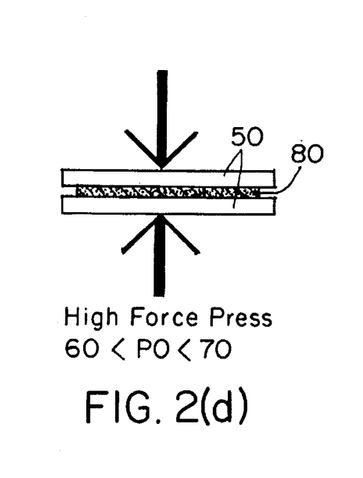
FIG. 2(d) shows the second compression at a higher pressure, typically from 600–1110 psi. PO decreases to between 55–70%.

As shown in FIG. 2(d), the next step is to press the sintered green form 80 in compressing means 50 to attain the final dimensions desired. The pressing is generally done at a higher pressure than the initial compaction step, given the fact that the sintered form 80 is now much more rigid. The pressures generally used in this step are usually from about 600 to 1100 psi. In a preferred embodiment, the sintered green form is pressed at greater than 1000 psi. This step reduces the porosity of the product to its final porosity value to produce membrane element sheet 90. The final porosity is typically greater than 55%, and in a preferred embodiment greater than 65%.

Figure 2E:
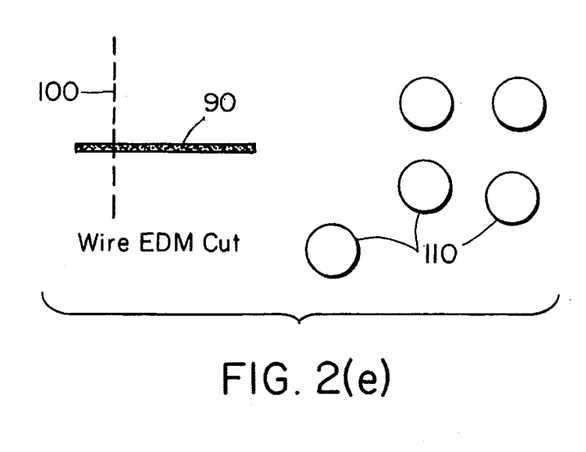
FIG. 2(e) shows the cutting step. Wire EDM cutting is depicted.

As shown in FIG. 2(e), the metallic membrane element sheet 90 may be cut into forms that allow construction of useful filter devices. In a preferred embodiment, wire Electrical Discharge Machining (EDM) is employed for this purpose. Wire EDM cutting is defined as the cutting of metals with a thin wire 100 through which a high electrical current is passed. This method of cutting the membrane element sheet 90 into membrane elements has given the best results. However, one of ordinary skill in the art will be able to adapt other cutting methods that may work equally well. For instance, cutting with an abrasive wheel or laser may effect adequate separation. In a preferred embodiment the size of the nickel membrane element 110 is approximately 1.2 cm in diameter and 0.25 cm in thickness.

Figure 2F:
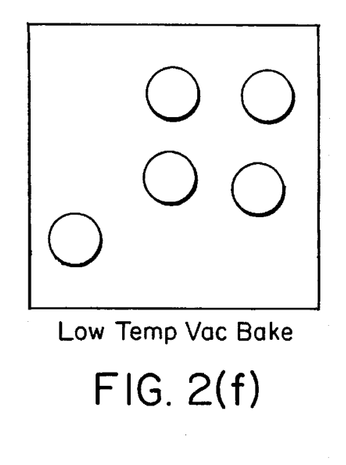
FIG. 2(f) shows the final low-temperature vacuum bake step.
Figure 3:
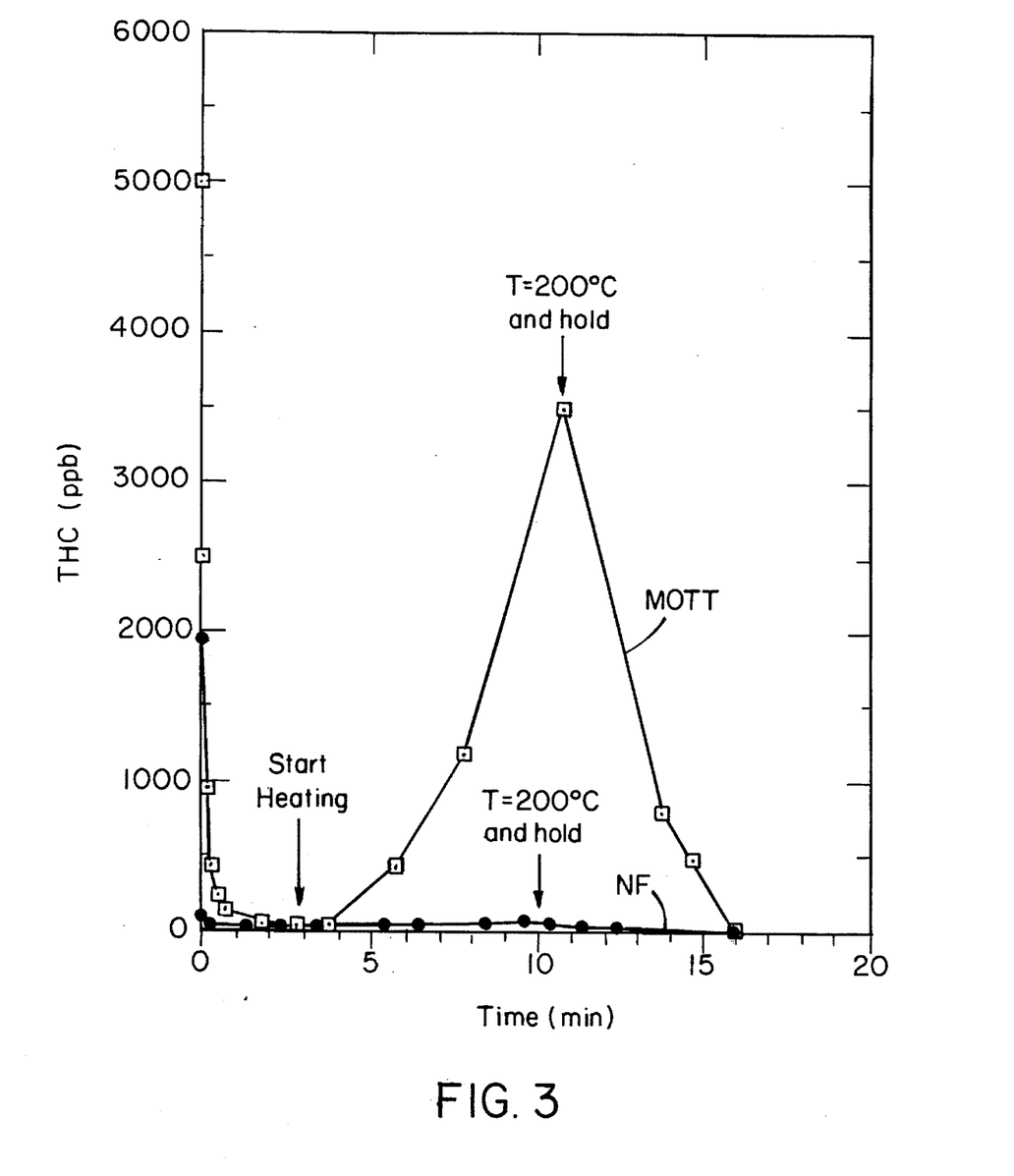
FIG. 3 is a graph of total hydrocarbons (ppb) versus time (minutes) representing total hydrocarbon outgassing from the Mott GasShield™ model POU-05 and the present invention.

Referring now to FIG. 2(f), the membrane elements 110 are low-temperature vacuum-baked to remove any volatiles introduced during the process. The temperature is usually less than 200° C. The final product exhibits minimal outgassing as depicted in FIG. 3. FIG. 3 is a graph of total hydrocarbons (ppb) versus time (minutes). When compared against the prior art, outgassing from the present invention is negligible. Outgassing was measured on a Beckman Model 400A THC Analyzer. The analyzer utilizes a flame ionization detector (FID) to determine the amount of total hydrocarbons (hydrocarbons of all molecular weights) present in a gaseous sample. In the present case, the gas was passed through the filter and on to the analyzer.

Figure 4:
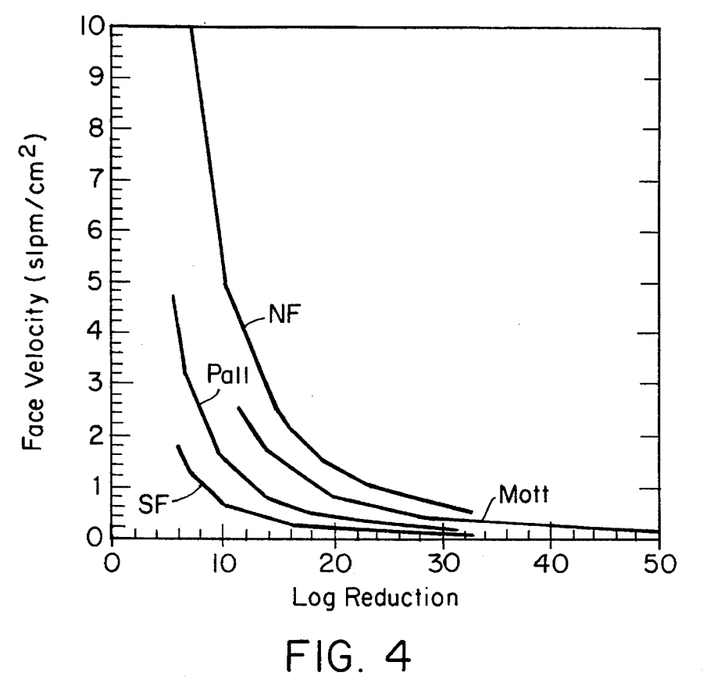
FIG. 4 is a graph of face velocity (slpm/cm$^2$) versus the log reduction values (LRV) for the invention, and for various prior art products. The invention (labeled "nf") shows higher LRVs at all face velocities. Prior art products are the "sf" filter (Wafergard® II SF Mini In-line Gas Filter, Millipore Corporation, Bedford, Mass.); Ultramet-L Gaskleen™, model #GLFF4000VMM4, (Pall Corporation, East Hills, N.Y.); Mott GasShield model POU-05 (Mott Mettalurgical Corporation, Farmington, Conn.).

The small-diameter membrane element disks demonstrate high efficiency and flow rates. As depicted in FIG. 4, a filter made in accordance with the present method (designated "nf") clearly shows the high efficiency of a nickel membrane element. FIG. 4 is a graph of face velocity (standard liters per minute, hereinafter "slpm") versus log reduction value (LRV). LRV is defined as the log of the ratio of two numbers. In the present case, the ratio is that of the number of particles impacting the filter membrane element on the upstream side of the filter, to the number of particles detected downstream of the filter. Therefore, an LRV value of 7 would imply a challenge of $10^7$ particles and the detection of 1 particle downstream, the log of this ratio being 7. The test is conducted by generating an aerosol containing several million particles with a size distribution centered around 0.014 m, passing this aerosol through the filter and counting those that pass with a condensation nucleus counter (CNC).

Figure 5:
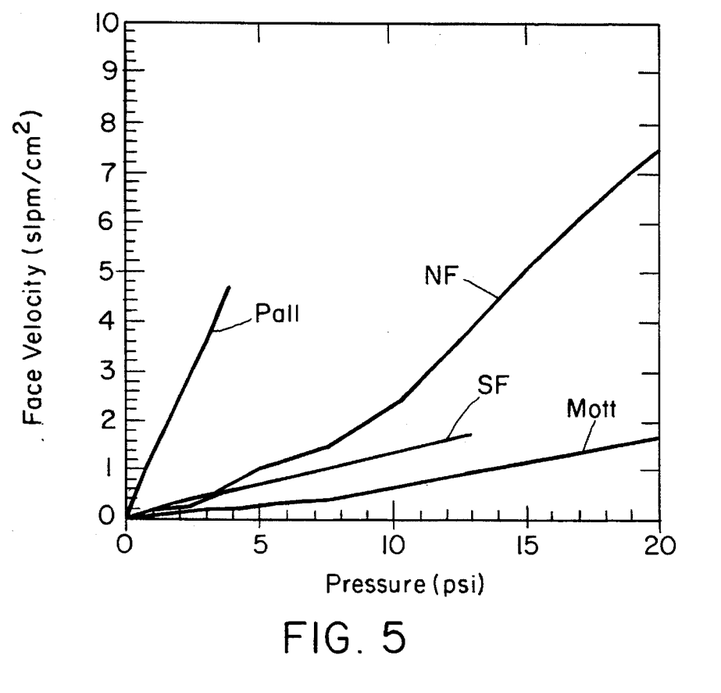
FIG. 5 is a graph plotting face velocities (slpm/cm$^2$) against pressure for the same products as in FIG. 4.

The nickel membrane element of the present invention demonstrates excellent gas permeability and exponential flow characteristics. FIG. 5 is a graph of slpm/cm$^2$ versus pressure. Compared are the sintered metal nickel powder filter of the present invention ("nf"), one from Mott Metallurgical Corporation (Mott GasShield™), a sintered steel powder filter from Millipore Corporation, Bedford Mass. (model Wafergard® II SF Mini Inline Gas Filter), and a steel mesh filter from Pall Corporation (Ultramet-L Gaskleen™, model #GLFF4000VMM4, East Hills, N.Y.). Of the three sintered metal powder filters, the 63% porous nf filter exhibits significantly greater permeability at all operating pressures above approximately 5 psi. At 10 psi, the nf filter has a face velocity of 2.4 slpm/cm$^2$ while the other two are at 0.8 and 1.5, respectively. At 20 psi the difference is even greater, with the nf filter at 7.5 versus 1.8 slpm/cm$^2$ for the Mott filter.

Figure 6:
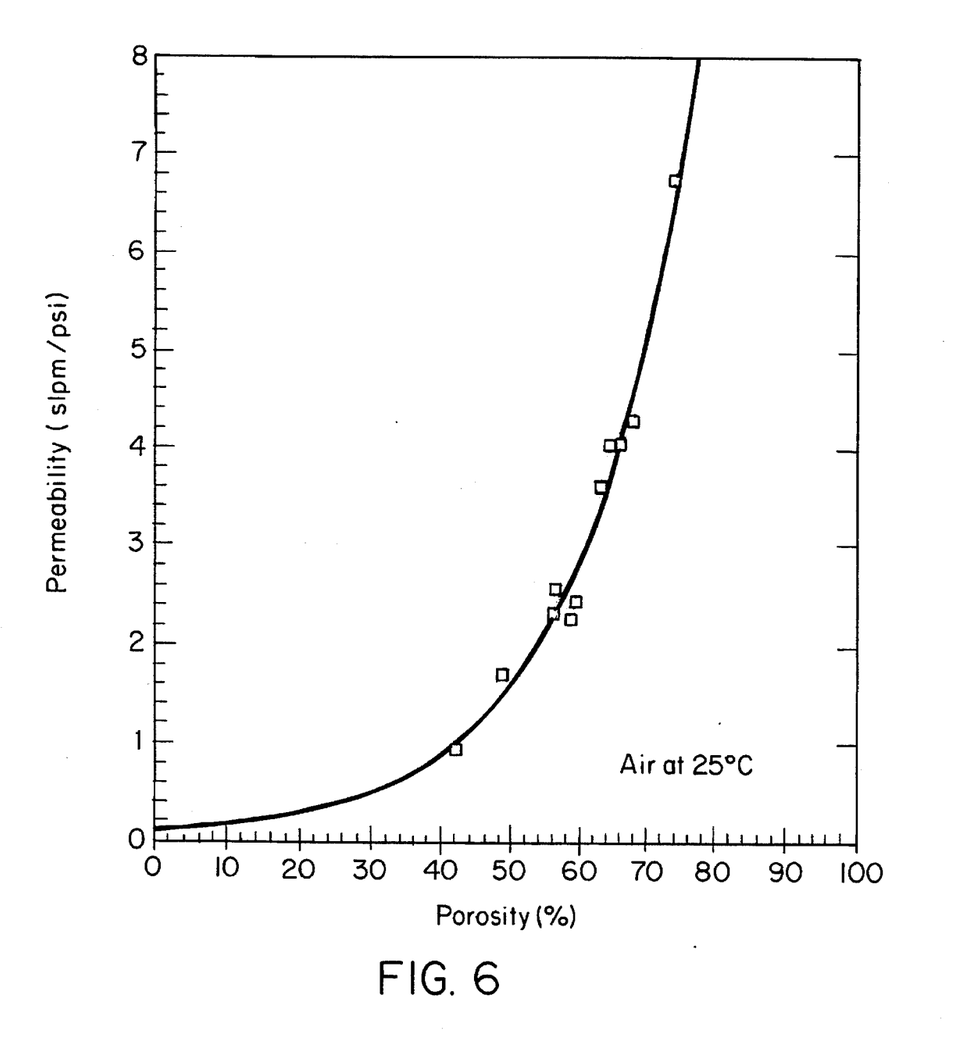
FIG. 6 is a graph showing the realtionship between porosity and permeability of the membrane of the present invention.

FIG. 6 is a further demonstration of the exponential increase in gas flow made possible by the present invention. FIG. 6 is a graph of permeabilty in standard liters per minute for a given pressure (slpm/psi) versus per cent porosity. The data points shown are normalized for a common thickness of 0.10 inch (0.254 cm), having an area of 1 cm$^2$. Typical prior art devices with porosities of 44% (material shown in FIG. 1(b)) have a permeability of approximately 1.2 slpm/psi. However, an 11% increase in porosity to 55% (a 25% increase in porosity) leads to a permeability of 2.2 slpm/psi, an 83% increase in permeabilty. A 65% porous filter membrane element has a permeability of 4.0 slpm/psi, an increase of 233% over the 44% porous membrane. Finally, a 70% porous membrane is 333% more permeable than a 44% porous membrane. The impact of the exponential relationship shown in FIG. 6 is demonstrated by the increased face velocities for the 63% porous nf filter, as compared to the prior art devices (FIG. 5).

It is clear that the present invention is a clear departure from the prior art. Typical prior art porosities range from 40–44%, with accompanying low permeabilities. The present invention demonstrates permeabilites of from 83% to 333% greater than those demonstrated by materials of the prior art, a surprising result.

Figure 7:
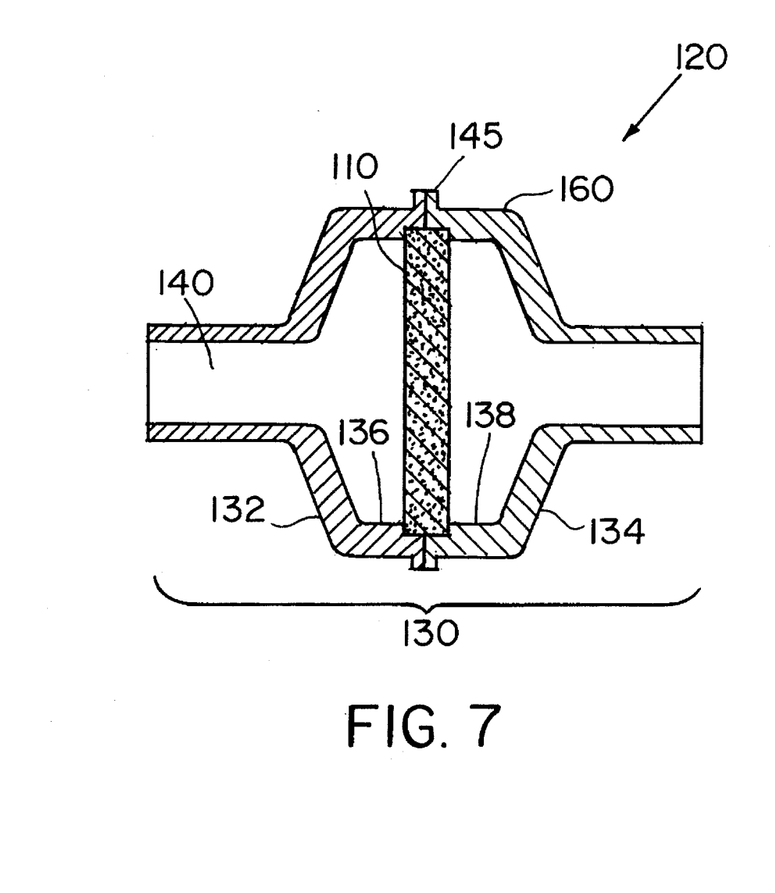
FIG. 7 is a cross-sectional schematic of the filter device of the present invention prior to welding the membrane element to the inner circumference of the filter housing.
Figure 8:
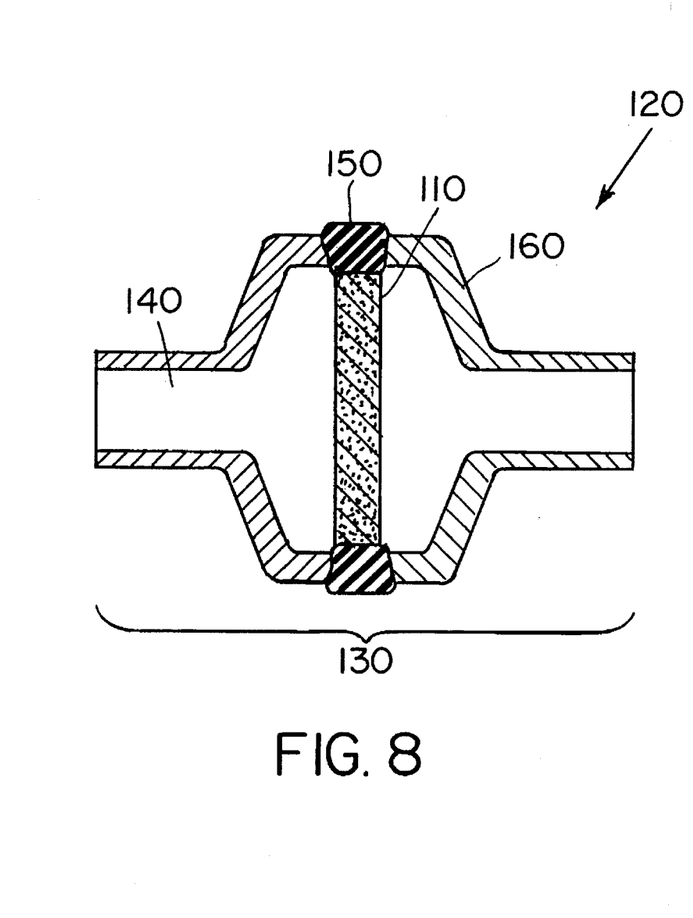
FIG. 8 is a cross-sectional schematic of the filter device of the present invention after welding the membrane element to the inner circumference of the filter housing.

As shown in FIGS. 7 and 8, the membrane element 110 may be incorporated into a filter device 120. The filter device 120 comprises a filter housing 130 defining a fluid conduit 140, filter housing 130 comprising a casing for retaining the element in the fluid flow path, the casing having an anterior 132 and a posterior 134 with the element being located therebetween and being sealably joined to the interior casing wall 136 and 138, the housing 130 thereby defining a filtered fluid flow path. Means for sealably connecting the casing to a fluid to be filtered are provided. These include Swagelok® fittings and the like. The main requirement for the connecting means is that it be fluid-tight, i.e., does not leak. One of ordinary skill will be able to determine what means are appropriate under the particular connecting scenarios.

Fabrication of filter devices incorporating the membrane elements is accomplished according to the following general procedure. First, a suitable material is selected for the filter housing 130. The material must be suitable for use under the ultra-clean conditions necessary in the semiconductor fabrication art. Stainless steel is a preferred material, although one of ordinary skill in the art is able to select a suitable filter housing material. The housing is usually constructed of two symmetric halves 132 and 134. The metal membrane element 110 is situated between the two halves 132 and 134. A lip 145 is machined or cast into the outer surfaces of the two housing halves 132 and 134 prior to assembly. Halves 132 and 134 are then united with membrane 110, touching the inner circumference of the housing as depicted in FIG. 7. The two halves 132 and 134 are welded together by heating or other means, sealing membrane 110 within the two halves of the housing. When it solidifies, the result is a solid steel-nickel weld bead 150 which extends from the periphery of the filter housing 160 to the interior of the membrane 110 as shown in FIG. 8. Examination of photomicrographs of sectioned devices have shown this to be the case when correct welding parameters are followed. One of ordinary skill in the art is able to determine the welding parameters through routine trial and error.

Having now generally described this invention, the same will become better understood by reference to certain specific examples which are included herein for purposes of illustration only and are not intended to be limiting unless otherwise specified. All patents and publications cited herein are fully incorporated by reference in their entirety.

EXAMPLES

Example 1

Effect of varying the thickness of the air-laid bed on green form density

This example shows that differences in the green form density are directly related to the amount of compaction selected during the initial compressing step. To start, three grams of filamentary nickel powder (INCO 255) were sifted into a 2.54 cm diameter mold as previously described under air-laying techniques, and two individual but identical green forms were made. The initial thickness of both air-laid beds was 0.3–0.4 cm. The first mold (green form number 1) was pressed at 150 psi to a green form with a thickness of 373 cm and a porosity before sintering of 82%. The same mold with the same air-laid bed of INCO 255 nickel powder is compressed again at 500 psi to a thickness of 0.261 cm and a porosity of 74% before sintering. Both are sintered in vacuum at 675° C. for 20 minutes. Number 1 has a final porosity of 75% (a change of −7%), number 2 a final porosity of 63% (a change of −11%). Clearly there is a direct relationship between the pressure applied to the INCO 255 nickel powder and the final porosity. With this teaching one of ordinary skill in the art is able to determine with routine experimentation what pressure will be necessary to attain a certain desired final sintered density.

Example 2

Effect of varying the weight of the green form on the final density

Adding weight (i.e. more powder) to the mold results in a thicker product with higher density. Two green forms of different weight but identical dimensions are made as previously described in Example 1. The first (number 3) had an initial weight of 2.50 g, and an initial porosity of 75% and was pressed at 500 psi. The second (number 4) had an initial weight of 3.50 g and tin initial porosity of 66% and was pressed at 1000 psi. Both green forms had a thickness of 0.230 cm. Both were sintered at 675° C. for 20 minutes in vacuum. Number 3 had a final porosity of 66% ( a change of −9% from the initial porosity). Number 4 had a final porosity of 54% ( a change of −12%).

Example 3

Effect of varying the sintering temperature on the density

Four green forms were made to the same specification as 1, 2, 3 and 4 as described above, number 5 having the same weight and dimensions as number 1, number 6 as number 2 and so on. All 4 green forms were sintered at 775° C. for 20 minutes. An additional four green forms (numbers 9–12) were made, again as numbers 1–4, and sintered in vacuum at 725° C. for 20 minutes.

The results of the three examples below clearly indicate that both green form density and sintering temperature have a direct impact on the final porosity of the metal membrane. It is apparent that the more dense the green form, the greater the decrease in porosity due to sintering. It is also quite clear that higher sintering temperatures result in increased shrinkage and lower porosity. Table 1 is a summary of the results:

TABLE 1

| # | Temp. (C.) | Green Porosity (%) | Final porosity (%) | Change from Green |
|---|---|---|---|---|
| 1 | 675 | 82 | 75 | −7 |
| 2 | 675 | 74 | 63 | −11 |
| 3 | 675 | 75 | 66 | −9 |
| 4 | 675 | 66 | 54 | −12 |
| 5 | 775 | 82 | 68 | −14 |
| 6 | 775 | 74 | 56 | −18 |
| 7 | 775 | 75 | 58 | −17 |
| 8 | 775 | 66 | 42 | −24 |
| 9 | 725 | 82 | 71 | −11 |
| 10 | 725 | 74 | 63 | −11 |
| 11 | 725 | 75 | 63 | −12 |
| 12 | 725 | 66 | 49 | −17 |

Example 4

A preferred fabrication process for making metal powder membranes 70 grams of filamentary nickel powder are sifted into a 12.7 cm diameter mold from a height of 20 cm to give a 0.7 cm-thick bed. This bed is pressed at approximately 30 kg/cm$^2$ (430 psi) to a thickness of 0.4 cm and a density of 1.3 g/cc. The green form has a porosity of 85%. It is sintered at 675° C. for 20 minutes in vacuum. After sintering, the green form (now with a diameter of 11 cm and a thickness of 0.28 cm) is pressed at approx 72 kg/cm$^2$ (1032 psi) to a thickness of 0.25 cm and a density of 2.95 g/cc. The final product has a porosity of 67%.

Although the foregoing invention has been described by way of illustration and example for purposes of clarity and understanding, it will be obvious that certain changes and modifications may be practiced within the scope of the invention, as limited only by the scope of the appended claims.

I claim:

1. A high-porosity metal filter comprising:
   a membrane element formed by sintering a mass of dendritic metal particles in the absence of any extraneous material cohesively binding or supporting said dendritic particles forming said mass;
   each of said metal particles having intertwined appendages and the intertwined appendages between adjacent sintered dendritic metal particles forming a matrix of substantially interconnected pores;

the porosity of said membrane element being defined by said intertwined appendages and being at least 55%.

2. The metal filter of claim 1 wherein said porosity is from about 55% to about 70%.

3. The metal filter of claim 1 wherein said metal comprises nickel.

4. The metal filter of claim 1 wherein said element is sintered at a temperature of from about 675° C. to about 725° C.

5. The metal filter of claim 1 wherein a substantially uniform low-density bed of said dendtritic metal particles is formed prior to sintering by air-laying said particles into a mold.

6. A high-porosity membrane filter comprising:

a membrane element formed by sintering a mass of dendritic metal particles in the absence of any extraneous material cohesively binding or supporting individual dendritic particles forming said mass;

each of said metal particles having intertwined appendages and the intertwined appendages between adjacent sintered particles forming a matrix of substantially interconnected pores within said membrane element, the porosity of said element being at least 55%;

a filter housing defining a fluid conduit, said housing comprising a casing for retaining said membrane element in said fluid conduit, said casing having an anterior and a posterior with said element being located therebetween and being sealably joined to said casing, said housing thereby defining a filtered fluid flow path; and means for sealably connecting said casing to a fluid to be filtered.

7. The high-porosity membrane filter of claim 6 wherein the porosity of said membrane element is from about 55% to about 70%.

8. The high-porosity membrane filter of claim 6 wherein said metal particles are nickel particles.

9. The high-porosity membrane filter of claim 8 wherein said membrane element is sintered at a temperature of from about 675° C. to about 725° C.

10. The high-porosity membrane filter of claim 6 wherein a substantially uniform low-density bed of said dendtritic metal particles is formed prior to sintering by air-laying said particles into a mold.

11. A method of making a high-porosity metallic membrane element comprising the steps of:

air-laying a substantially uniform low-density bed of a sinterable dendritic material into a mold in the absence of any extraneous material, said mold being suitable for applying compressive force thereto, said bed having a density less than the apparent density of said sinterable dendritic material;

compressing said low-density bed to form a green form; and sintering said green form.

12. The method of claim 11 wherein compressing said substantially uniform low-density bed of sinterable dendritic material occurs at a pressure below about 500 psi.

13. The method of claim 11 wherein compressing said substantially uniform low-density bed occurs at a pressure below about 1000 psi.

14. The method of claim 11 wherein said sinterable dendritic material comprises nickel.

15. The method of claim 11 wherein said metallic membrane element has a porosity of from about 55% to about 70%.

16. The method of claim 11 wherein said green form is sintered at a temperature of from about 675° C. to about 725° C.

17. The method of claim 11 wherein said membrane element is compressed at a second higher pressure after sintering, thereby imparting additional structural rigidity to said element.

18. The method of claim 11 wherein said membrane element is cut into individual filter elements of a predetermined size.

19. The method of claim 18 wherein said membrane element is cut by wire electrical discharge machining.

* * * * *